United States Patent Office 3,014,245
Patented Dec. 26, 1961

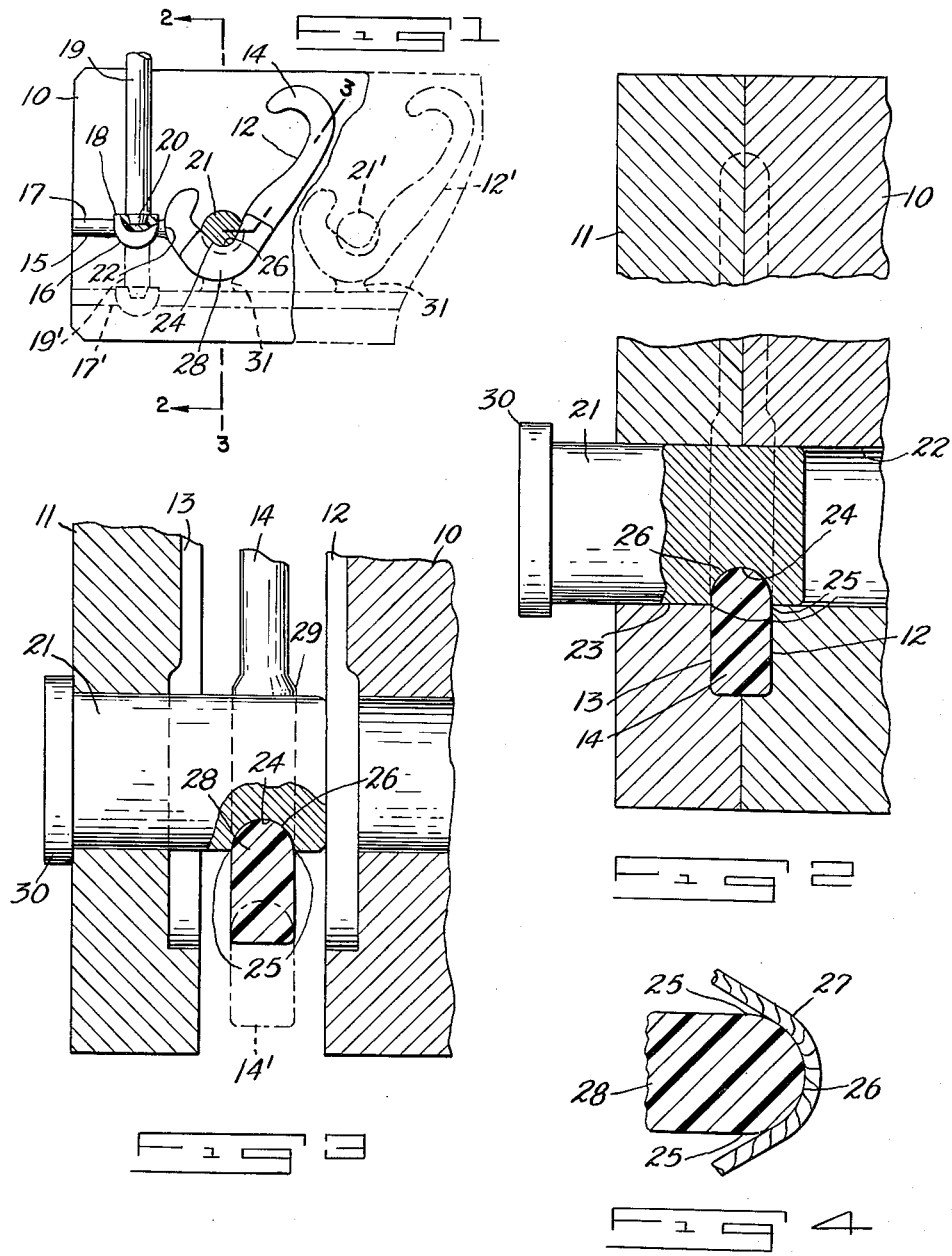

3,014,245
METHOD OF PRODUCING SMOOTH THREAD CONTACT SURFACE IN MOLDED TRAVELERS
Louis H. Morin, Bronx, N.Y., assignor to Coats & Clark Inc., New York, N.Y., a corporation of Delaware
Filed July 3, 1958, Ser. No. 746,386
2 Claims. (Cl. 18—42)

This invention relates to the production of molded plastic travelers. More particularly, the invention deals with a method of forming a smooth uninterrupted surface in the croc or thread contact engaging portion of a traveler, so as to avoid any possible abrasion or wear upon the thread in its passage over the traveler in the use thereof.

Still more particularly, the invention deals with a method, wherein a pin is employed in conjunction with a pair of relatively movable dies to form, in conjunction with the dies, the complete cavity for forming the molded traveler, the cavity portion of the pin forming the thread engaging portion of the resulting traveler in a smooth and finished contour by location of the pin cavity on the parting line of the dies, thereby eliminating the formation of a parting line or flash of the molded material along said area of the resulting traveler.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 illustrates in full lines a diagrammatic view of the face of one die, showing the die pin arranged therein in section and indicating the method of forming a traveler, as illustrated in FIGS. 2 and 3 of the drawing and also indicating, in dot-dash lines, the method of procedure in simultaneously forming two or more travelers.

FIG. 2 is an enlarged sectional view on the line 2—2 of FIG. 1, showing the dies in closed position.

FIG. 3 is a view, similar to FIG. 2, but taken on the broken line 3—3 of FIG. 1, showing only part of the construction, with the dies in open position and also indicating, in dot-dash lines, movement of the traveler, preparatory to discharge of the traveler from the die area; and FIG. 4 is an enlarged broken sectional view through the thread engaging portion of the traveler, omitting all background showing, and diagrammatically illustrating the passage of thread over the thread engaging portion of the traveler.

In FIGS. 2 and 3 of the drawing, I have shown at 10 and 11 a pair of dies having cavities 12 and 13 on adjacent surfaces thereof, generally defining the contour of the resulting traveler 14 to be formed.

FIG. 1 is a diagrammatic showing of the face view of the die 10 with its cavity portion 12. In this figure, 15 represents the sprue or gate passage on the adjacent surfaces of the dies, through which the plastic material is injected into the die cavities and in the sprue passage is an enlarged chamber 16, which forms integrelly with the gate 17 a lug or other enlargement 18.

In forming the casting, a transfer core 19 has its reduced tapered end 20 positioned within the chamber 16 so that the lug 18 is formed thereon. It will, thus, be seen that, after the traveler 14 has been molded and the dies moved into the open position shown in FIG. 3, the pin 19 can shift the molded traveler to the position indicated in dotted lines at 14' in FIG. 3 in removal of the same from the die pin 21 and, thus, in further moving the traveler to a position spaced with respect to adjacent surfaces of the dies, where the gate 17 can be trimmed from the traveler along the line 22, noted in FIG. 1 of the drawing, and, then, the core pin 19 stripped from the gage 17 in accordance with the teachings well known in this art. After the stripping operation, the pin 19 is returned to its normal position between the dies and the dies are then closed, preparatory to forming the next successive molded traveler.

As noted in FIGS. 2 and 3 of the drawing, the die pin 21 is arranged in alined apertures 22 and 23 in the dies 10 and 11, respectively, the apertures 22 and 23 registering with the die cavities 12 and 13. In the molding operation, the normal position of the pin 21 is illustrated in FIG. 2 of the drawing and the pin in this position has its cavity portion 24 registering with the cavities 12 and 13 of the dies. The cavity 24 is half-round and concave in cross-sectional contour when the section plane includes the axis of the pin 21, as clearly seen in FIG. 2 of the drawing, and in this figure, it will appear that the rounded cavity blends into and is in direct alinement with the side surfaces of the cavities 12 and 13, so that any flash or flare of the molded material would take place at the points 25 and not on any part of the rounded surface 26 on the resulting molded traveler. Note, in this connection, FIG. 4 of the drawing, where the positions of any possible flash or irregularities are noted by the reference characters 25, which are beyond any point of possible engagement with the thread in its passage over the traveler. In FIG. 4 of the drawing, the thread is diagrammatically illustrated at 27 in order to demonstrate the smooth round surface 26, over which the thread passes. As may be seen in FIG. 1, the cavity portion 24 is convex in a cross-section formed by a section plane perpendicular to the axis of pin 21. Cavity portion 24 is thus saddle-shaped, concave in one direction and convex in a second direction perpendicular to the first.

It will appear, from a consideration of FIG. 1 of the drawing, that the cavity portion 24 of the pin 21 extends only to the sides of the pin but at a point sufficiently far beyond the curved surface 26 to leave a wide range of travel in this area of the hook end portion 28 of the resulting traveler.

It will appear, from a consideration of FIG. 3 of the drawing, that that part of the hook end portion 28 in which the smooth rounded surface 26 is formed is somewhat thicker than the remainder of the traveler and this enlargement or greater thickness is indicated by the reference character 29 in said figure.

It will appear, from a consideration of FIGS. 2 and 3 of the drawing, that the outer end of the pin has an enlarged head or collar 30, against which the die 11 seats when in its open position, as noted in FIG. 3 of the drawing. In this connection, it will be understood that the pin 21 is suitably supported in fixed position with respect to the movable dies and, in fixing this position, the cavity portion 24 is, at all times, located in the position illustrated in FIG. 2 of the drawing.

In FIG. 1 of the drawing, I have diagrammatically illustrated in dot-dash lines the simultaneous formation of two or more travelers in a single injection of the plastic material into the die cavities. In other words, at 12' is shown one additional cavity, similar to the cavity 12. At 21' is indicated a second pin, similar to the pin 21 but, in this modified arrangement, a longer core pin 19' is employed, so as to position the same at a lower point in the dies to register with a gate passage 17', similar to 17. Here, a longer gate is employed, having branches 31 exposed to the lower rounded surfaces of the travelers to be molded.

It will, thus, be apparent that, in the trimming operation, the branches 31 will be trimmed from the travelers simultaneously.

Aside from the slight changes noted above, the method of procedure in forming the multiplicity of travelers will be the same as in forming a single traveler, as shown in full lines in FIG. 1 of the drawing.

From the foregoing, it will appear that the die structure, in formation of a single traveler, may be said to comprise three die parts, namely the parts 10 and 11 and the pin 21; whereas, in forming two or more travelers, the die parts would be computed by the two dies and the number of pins employed in forming the predetermined number of travelers in accordance with the illustration in dot-dash lines in FIG. 1 of the drawing.

In the use of the third die part, namely the pin 21 actually transfers the parting line from the normal parting line defined by adjacent surfaces of the dies to positions remote from this parting line, in other words, to a position where the cavity 24 of the pin 21 registers with the cavities 12 and 13, as at the positions 25, and these positions extend to the opposed sides of the pin 21, as is clearly apparent from a consideration of the section of the pin 21, as noted in FIG. 1 of the drawing. At this time, it will also appear that the cross-sectional contour of the die pin 21 with respect to the hook end 28 is such as to pass the molded traveler by the pin 21 in the downward feed of the transfer pin 19 to position the same between trimming tools, not shown, in performing the trimming operation and also the operation of stripping the transfer pin 19 from the gate 17, or the lug part 18 thereof.

For purposes of description, the hook end portion 28 can be regarded as the thread engaging hook end of the traveler which includes the rounded or curved smooth thread engaging surface 26.

It will also be apparent that, in accordance with the method disclosed, a supplemental die or a series of supplemental dies are positioned in closed dies, so as to dispose such supplemental dies, similar to the pins 21, 21', with their cavities arranged on and registering with and bridging the parting line of the dies. It will, thus, be apparent that the cavity of the supplemental die can position on the resulting molded product the smooth flash-free surface wherever desired on the product, providing, however, that the product can be removed from the supplemental die after the same has been molded.

In consideration of the end product as an article of manufacture, it may be said that this molded end product includes, at its peripheral edges, minute parting line markings, descriptively termed "fins" and these fins are interrupted in at least one section of such peripheral edges in a smooth non-finned surface, production of this end product being made possible by the teachings in my novel method.

Having fully described my invention, what I claim as new and desire to secure by Letters Patent is:

1. In a die set for producing molded travelers which comprises first and second principal dies adapted to assume a closed position and having abutting surfaces when in said closed position and relatively movable from a closed to an open position in an opening direction substantially perpendicular to the abutting surfaces and having cavity portions adapted to partially define the shape of a desired molded traveler, the improvement for producing a desired thread contacting surface on the molded traveler, comprising surfaces defining a first aperture in the first principal die, said first aperture having an axis at an angle to the plane of the abutting surfaces; a third die adapted to slide in the first aperture and to move with respect to the first and second dies and adapted to assume a closed position such that when the first, second, and third dies are in their closed positions the third die extends between the first and second dies in contact with said dies and across the plane of the abutting surfaces thereof; a saddle-shaped cavity portion on the third die concave in a first direction and convex in a second direction perpendicular to the first direction, said saddle shaped cavity portion adapted to define the desired thread contacting surface free of mold parting lines when the dies are in their closed positions, at least one portion of the desired surface so defined being undercut with respect to the opening direction as viewed from one of the principal dies when the molded traveler is in the die set and said desired surface adapted to continue adjacent surfaces formed by the first and second die cavity portions when the dies are in their closed positions.

2. The die set of claim 1 comprising surfaces defining a second aperture in the second principal die, said second aperture alined with the first aperture when the dies are in their closed positions and a portion of the third die adapted to be slidably located and supported within the second aperture when the dies are in said closed positions.

References Cited in the file of this patent

UNITED STATES PATENTS

| | | |
|---|---|---|
| 906,256 | Mell | Dec. 8, 1908 |
| 1,101,732 | Doughty | June 30, 1914 |
| 1,535,715 | Canfield | Apr. 28, 1925 |
| 1,680,823 | Teed | Aug. 14, 1928 |
| 1,984,779 | Wentworth | Dec. 18, 1934 |
| 2,118,873 | Wentworth et al. | May 31, 1938 |
| 2,510,716 | Portmann et al. | June 6, 1950 |
| 2,579,952 | Morin | Dec. 25, 1951 |
| 2,698,464 | Wilson | Jan. 4, 1955 |

FOREIGN PATENTS

| | | |
|---|---|---|
| 721,751 | Great Britain | Jan. 12, 1955 |
| 786,920 | Great Britain | Nov. 27, 1957 |